March 5, 1929. R. G. BOEHM 1,704,031
ANTIFRICTION NUT
Filed April 11, 1927
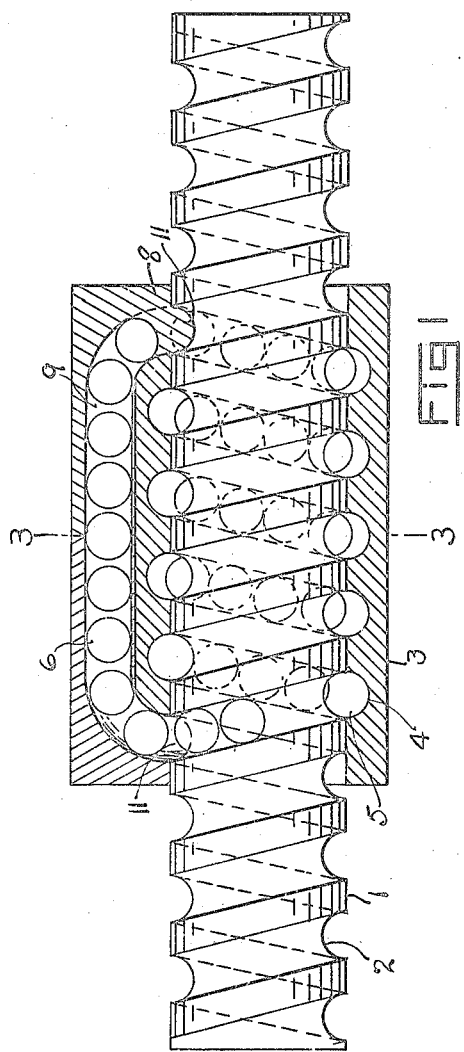
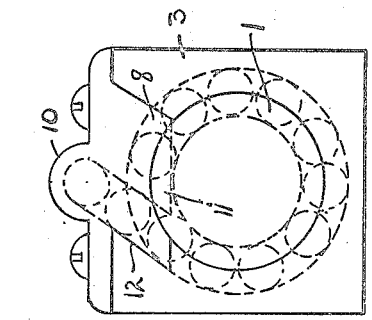
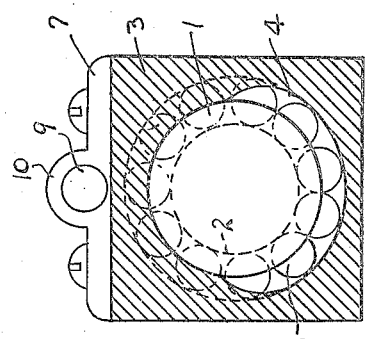
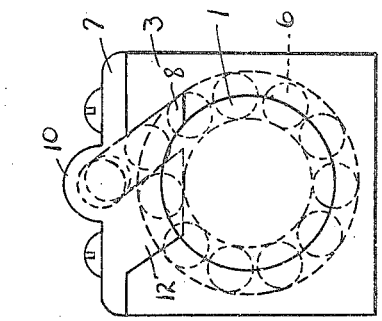
Rudolph G. Boehm, Inventor
By Jesse R. Stone, Attorney Patented Mar. 5, 1929.

1,704,031

UNITED STATES PATENT OFFICE.

RUDOLPH G. BOEHM, OF SUGAR LAND, TEXAS.

ANTIFRICTION NUT.

Application filed April 11, 1927. Serial No. 182,942.

My invention relates to an anti-friction nut and a co-operating member, such as a bolt or shaft, upon which said nut is screwed.

It is an object of the invention to provide a nut having a rolling anti-friction connection with the member upon which it is screwed, so that the nut may be moved relative to the member with a minimum of effort.

It is desired that anti-friction rollers be employed to roll in spiral races and answer in the place of the usual threaded connection between a nut and shaft, and provide means to cause a continuous stream of rolling elements to pass through said races or grooves.

The invention contemplates the use of spirally grooved nuts and shafts therein with non-friction members rolling in said grooves.

Referring to the drawings herewith for a better understanding of the invention, Fig. 1 is a side elevation of a shaft or bolt with my improved nut thereon, said nut being shown in central vertical section. Fig. 2 is an end elevation of the bolt and nut. Fig. 3 is an end view of the bolt or shaft with the nut thereon in central vertical section. Fig. 4 is an end view of the assembly taken from the end opposite that shown in Fig. 2.

It is to be understood that my invention is to be applied generally to nuts to be employed upon bolts or shafts or similar cylindrical members and reference herein to a shaft is intended to designate generally elements of that nature including bolts and pins. In the drawing, a cylindrical shaft 1 is shown having thereon a groove 2 extending spirally about the shaft from one end to the other and forming therein a channel having its trough shaped to conform to the shape of an anti-friction ball or roller which is to fit therein. I have shown the groove as formed on the arc of a circle so as to accommodate a ball bearing, it being understood, however, that other types of an anti-friction bearing may be used.

The nut 3 which I employ is formed with a central longitudinal opening therethrough to fit slidably upon the shaft 1. Its interior face is formed with a groove 4 therein of the same pitch and size as is the groove 2 in the shaft and the two grooves 2 and 4 are adapted to register when the nut is fitted over the shaft so as to form a channel, indicated at 5 in Fig. 1, which is circular in cross section and into which the balls 6 may be fitted.

One side of the nut, shown at the upper side in the drawings, is cut away at the ends to receive a cap plate 7. Said plate is flattened on its inner face except at the ends where it is extended downwardly, as shown at 8, to fit against the outer surface of the shaft 1. With reference to Figs. 2 and 4, it will be noted that the extensions 8 at the ends of the plate are directed inwardly toward the shaft at an angle to the body of the nut and the direction of inclination of the extension is to accommodate a channel for the balls 6 so as to deflect them out of the channel 5 at each end of the nut in order that they may be returned to the opposite end.

The plate 8 is preferably made in two sections adapted to fit together at their inner ends and a channel 9 is formed in said plate, a central upward extension 10 being formed on the plate to provide for said channel. The ends of the channel are curved down to fit with the grooves in the ends of the nut and with the shaft. The end extension 8 on the plate has a tongue 11 fitting within the groove 2 in the shaft and acting to prevent the passage of the balls beyond the end of the nut and diverting them upwardly into the channel 9 in the plate. One side of the tongue 11 is grooved or channeled to receive the balls and the body of the nut adjacent the tongue is formed with an upwardly inclined passage, indicated at 12 in Figs. 2 and 4 to direct the balls into the channel 9.

It will be noted in Figs. 2 and 4 that the extensions 8 on the ends of the plates extend at such an angle as to cause the tongue 11 and the channels 12 to register in such manner as to provide a continuous channel for the balls, and it is contemplated that there will be sufficiet number of balls 6 to loosely fill the channels 5 and 9 in the nut and plate so that there will be a non-friction bearing between the nut and the shaft in which the balls are circulated by the rotation of the nut in either direction, depending upon the direction of rotation of the nut upon the shaft and that the balls will circulate in either direction continuously about the shaft and through the nut and the plate 7 thereon, as will be obvious from the drawings. The balls will serve not only as an anti-friction bearing but will be the connecting means between the nut and the shaft and will hence take up the thrust when the nut is screwed up along the shaft.

The device will be of particular use where heavy loads are to be moved by means of a screw and the device may be therefore used in connection with jacks of the screw type and in many other situations where it is desired to exert a strong force by means of the screw. It will be noted that the device is simple in its construction and will be inexpensive to manufacture.

Its further advantages will be obvious to those skilled in the art.

What I claim as new and desire to protect by Letters Patent is:

1. A cylindrical shaft, having a spiral groove thereon, a nut fitting on said shaft and having a spiral groove of the same pitch as the groove on said shaft and forming therewith a roller channel, a plate on one side of said nut, means on said plate at each end of said nut to close said channel, and rolling members in said channel, said rolling members forming a connection between said nut and said shaft.

2. A cylindrical shaft, having a spiral groove thereon, a nut fitting on said shaft and having a spiral groove of the same pitch as the groove on said shaft and forming therewith a roller channel, a plate on one side of said nut, means on said plate at each end of said nut to close said channel, and rolling members in said channel, said rolling members forming a connection between said nut and said shaft, said plate having a channel therein to allow the passage of said members from one end of said nut to the other.

3. A cylindrical shaft, a nut thereon, said shaft and nut having registering grooves therein, balls adapted to roll in said grooves, and a plate on said nut having a ball conducting channel therein, and means on said plate to divert the balls from said groove at one end of said nut through said channel to the groove at the opposite end of said nut.

In testimony whereof I hereunto affix my signature this 8th day of April, A. D. 1927.

RUDOLPH G. BOEHM.